US010428888B2

(12) United States Patent
Al-Mahshi (10) Patent No.: US 10,428,888 B2
(45) Date of Patent: Oct. 1, 2019

(54) BRAKE SYSTEM

(71) Applicant: AKEBONO BRAKE INDUSTRY CO., LTD, Chuo-ku, Tokyo (JP)

(72) Inventor: Waleed Mahmoud Al-Mahshi, Farmington Hills, MI (US)

(73) Assignee: Akebono Brake Industry Co., Ltd., Chuo-ku, Tokyo (JP)

( * ) Notice: Subject to any disclaimer, the term of this patent is extended or adjusted under 35 U.S.C. 154(b) by 46 days.

(21) Appl. No.: 15/797,172

(22) Filed: Oct. 30, 2017

(65) Prior Publication Data
US 2019/0128353 A1    May 2, 2019

(51) Int. Cl.
| | | |
|---|---|---|
| *F16D 67/02* | (2006.01) | |
| *F16D 55/226* | (2006.01) | |
| *F16D 65/18* | (2006.01) | |
| *F16D 65/46* | (2006.01) | |
| *F16D 65/56* | (2006.01) | |
| *F16D 121/04* | (2012.01) | |
| *F16D 121/24* | (2012.01) | |
| *F16D 125/04* | (2012.01) | |

(Continued)

(52) U.S. Cl.
CPC ........... *F16D 67/02* (2013.01); *F16D 55/226* (2013.01); *F16D 65/18* (2013.01); *F16D 65/183* (2013.01); *F16D 65/46* (2013.01); *F16D 65/567* (2013.01); *F16D 2121/04* (2013.01); *F16D 2121/24* (2013.01); *F16D 2125/04* (2013.01); *F16D 2125/06* (2013.01); *F16D 2125/40* (2013.01)

(58) Field of Classification Search
CPC .... F16D 67/02; F16D 65/183; F16D 2125/36; F16D 2125/40; F16D 2125/06; F16D 2121/14; F16D 2121/24; F16D 2121/04; F16D 2123/00; F16D 55/226; F16D 65/18; F16D 2125/04; F16D 65/46; F16D 65/567
USPC ......... 188/71.2, 71.4, 71.7, 71.8, 72.1, 72.3, 188/72.7, 72.8, 106 F, 106 P, 156, 158, 188/153 R, 161, 73.1, 163, 171, 196 F, 188/196 D, 196 B
See application file for complete search history.

(56) References Cited

U.S. PATENT DOCUMENTS

| | | | | |
|---|---|---|---|---|
| 3,211,263 A | * | 10/1965 | Harrison | ............... F16D 65/567 188/196 BA |
| RE28,881 E | * | 6/1976 | Farr | .......................... 188/196 D |

(Continued)

FOREIGN PATENT DOCUMENTS

| | | | |
|---|---|---|---|
| DE | 3534455 A1 | * | 4/1987 |
| EP | 2270345 B1 | | 1/2012 |

(Continued)

*Primary Examiner* — Pamela Rodriguez
(74) *Attorney, Agent, or Firm* — The Dobrusin Law Firm, P.C.

(57) ABSTRACT

A brake system that includes a brake piston, a rotary to linear stage mechanism, and a clutch. The brake piston extends along a longitudinal axis. The brake piston includes a piston pocket. The rotary to linear stage mechanism includes a spindle and a nut. The nut is received in the piston pocket. The brake system is operable in a first braking application and in a second braking application. During the first braking application, the clutch is adapted to provide for the nut to rotate about the longitudinal axis. During the second braking application, the clutch is adapted to restrict or prevent the nut from rotating about the longitudinal axis.

20 Claims, 6 Drawing Sheets

(51) Int. Cl.
  *F16D 125/06* (2012.01)
  *F16D 125/40* (2012.01)

(56) References Cited

U.S. PATENT DOCUMENTS

| | | | |
|---|---|---|---|
| 4,256,206 A * | 3/1981 | Maehara | F16D 65/18 |
| | | | 188/196 D |
| 8,322,799 B2 | 12/2012 | Trimpe et al. | |
| 8,573,370 B2 * | 11/2013 | Maehara | F16D 65/183 |
| | | | 188/71.9 |
| 8,616,348 B2 | 12/2013 | Winkler et al. | |
| 9,297,433 B2 | 3/2016 | Takewaki et al. | |
| 9,316,277 B2 | 4/2016 | Winklet et al. | |
| 9,333,953 B2 | 5/2016 | Masuda et al. | |
| 9,340,190 B2 | 5/2016 | Qian et al. | |
| 10,184,536 B2 * | 1/2019 | Chelaidite | F16D 55/226 |
| 2005/0034936 A1 | 2/2005 | Drennen et al. | |
| 2007/0029142 A1 | 2/2007 | Drennen et al. | |
| 2009/0026024 A1 | 1/2009 | Baldeosingh et al. | |
| 2010/0082213 A1 | 4/2010 | Taylor et al. | |
| 2011/0011191 A1 | 1/2011 | Osterlaenger et al. | |
| 2012/0111673 A1 | 5/2012 | Giering et al. | |
| 2015/0362051 A1 | 12/2015 | Adler et al. | |
| 2016/0069403 A1 | 3/2016 | Yamasaki et al. | |
| 2016/0076607 A1 | 3/2016 | Yasui et al. | |
| 2016/0076631 A1 | 3/2016 | Funada | |
| 2016/0131212 A1 | 5/2016 | Yamasaki et al. | |

FOREIGN PATENT DOCUMENTS

| | | |
|---|---|---|
| EP | 3009705 A1 | 4/2016 |
| JP | 55072929 A * | 6/1980 |
| WO | 00/08352 A1 | 2/2000 |

* cited by examiner

BRAKE SYSTEM

FIELD

These teachings relate to a brake system, and more particularly to a brake piston assembly that includes a clutch.

BACKGROUND

A brake system typically includes a brake caliper that supports at least one brake piston. The brake piston is adapted to move at least one brake pad into contact with a moving component to create a clamping force. The clamping force may be adapted to slow, stop, or prevent movement of the moving component. In vehicular applications, the moving component may be a brake rotor that is in communication with a road wheel.

Some brake systems are operable in two applications, namely a hydraulic application, and an electromechanical application. The hydraulic application may be used to apply and/or release a service brake, and the electromechanical application may be used to apply and/or release a parking brake, or vice versa.

During the hydraulic application, a fluid may be pressurized, which may cause the brake piston to move into contact with the brake pad, and then move the brake pad into contact with the moving component to create the clamping force. Depressurizing the fluid may cause the brake piston to move away from the brake pad and then the brake pad to move out of contact with the moving component to release the clamping force.

During the electromechanical application, torque from a motor may be converted into a linear force by way of a rotary to linear stage mechanism. The linear force may be adapted to move the brake piston into contact with the brake pad, and then move the brake pad into contact with the moving component to create the clamping force.

A typical rotary to linear stage mechanism comprises a spindle and a nut. The spindle is in rotational communication with the motor, and the nut is threadably connected to the spindle. The nut is received in a piston pocket of the brake piston. Rotation of the spindle causes the nut to move axially along a length of the spindle and eventually into contact with a bottom wall of the piston pocket. With the nut in contact with the bottom wall of the piston pocket, continued movement of the nut causes the nut to push the brake piston into contact with the brake pad and then move the brake pad into contact with the moving component to create the clamping force.

A gap is typically defined between the nut and the bottom wall of the piston pocket. Thus, during the electromechanical application, the nut must first be moved to take up or eliminate the gap before movement of the nut actually pushes or moves the brake piston.

During the hydraulic application, an axial starting and stopping position of the brake piston changes over time. Stated another way, over time the brake piston is moved further out of the piston pocket in a direction closer towards the brake rotor as a result of brake pad wear. However, an axial position of the nut relative to the brake piston typically does not change during the hydraulic application. As can be imagined, over time, especially if the electromechanical application is used infrequently, the gap increases between the bottom wall of the brake piston and the nut. The size or magnitude of the gap may correspondingly increase the response time of the electromechanical application because the gap must first be taken up or eliminated before movement of the nut causes the brake piston thus the brake pad to move into contact with the moving component to create the clamping force.

It may therefore be desirable to have a brake system where an axial position of the nut changes together with an axial position of the brake piston during the hydraulic application. Stated another way, it may be desirable for the nut to be moved axially with the brake piston during the hydraulic application so that the gap between the nut and the bottom pocket wall remains substantially the same over time. This may advantageously reduce the lag time between the initial time when the electromechanical application is activated to when the nut makes contact with the brake piston and causes the brake piston to move the brake pad against the moving component to create the clamping force.

SUMMARY

These teachings provide a brake system where an axial position of the nut changes together with an axial position of the brake piston during a hydraulic application. Stated another way, these teachings provide for the nut to be moved axially with the brake piston during a hydraulic application so that the gap between the nut and the bottom pocket wall remains substantially the same over time. This may advantageously reduce lag time between the initial time when the electromechanical application is activated to when the nut actually contacts the brake piston and causes the brake piston to move the brake pad against the moving component to create the clamping force.

These teachings provide for a position of a nut to be automatically adjusted with movement of the brake piston during a hydraulic application so that the gap between the nut and the bottom pocket wall remains substantially the same over time. In this regard, the response time measured from the time the electromechanical application is initiated to when the clamping force is developed remains substantially the same, especially when the brake pads wear over time and the brake piston moves further out of the caliper bore, even if the electrotechnical application is seldom used.

These teachings provide a brake system that includes a brake piston, a rotary to linear stage mechanism, and a clutch. The brake piston extends along a longitudinal axis. The brake piston includes a piston pocket. The rotary to linear stage mechanism includes a spindle and a nut. The nut is received in the piston pocket. The brake system is operable in a first braking application and in a second braking application. During the first braking application, the clutch is adapted to provide for the nut to rotate about the longitudinal axis. During the second braking application, the clutch is adapted to restrict or prevent the nut from rotating about the longitudinal axis.

DETAILED DESCRIPTION

The brake system according to these teachings may be any system or assembly for creating a clamping force. The brake system may function to create a clamping force to slow, stop, and/or maintain a moving component, such as a brake rotor or a road wheel of a vehicle, in a stopped or parked position. The brake system may function to release the clamping force so that the moving component, such as the brake rotor or the road wheel of the vehicle, can move.

The brake system according to these teachings may find use in vehicular applications (i.e., cars, trucks, SUVs, ATVs, motorcycles, airplanes, etc.). The brake system according to these teachings may find use in non-vehicular applications, such as, for example, in a lathe, a paper winder, amusement park rides, etc.

The brake system may be an opposing brake system (i.e., a fixed caliper brake system) or a floating brake system (i.e., a floating caliper). The brake system may be a disc brake system. The brake system may be used as a service brake to slow, stop, and/or maintain a brake rotor, a road wheel, or a vehicle, in a stopped position. The brake system may be used as a parking brake to maintain a brake rotor, a road wheel, or a vehicle, in a parked position.

Clamping force may be any force that, when coupled with a brake pad coefficient of friction, functions to decelerate, slow, stop, and/or prevent movement or rotation of a moving component. The clamping force may be created during a standard brake apply or application of the service brake (i.e., a brake apply force) to slow, stop, or prevent movement of a moving component, a brake rotor, a road wheel, or vehicle. The clamping force may be created during a parking brake apply (i.e., a parking brake force) to prevent or restrict movement of a stopped or parked moving component, brake rotor, road wheel, or vehicle.

The brake rotor may cooperate with the components of the brake system, the parking brake system, or both to create the clamping force. The brake rotor may include an inboard side and an opposing outboard side. The brake caliper may be arranged so that one or more brake pads are located at the inboard side of the brake rotor (i.e., inboard brake pads), and one or more brake pads are located at the outboard side of the brake rotor (i.e., outboard brake pads), or both. When a vehicle is in motion, the brake rotor may rotate with a wheel and about an axle of a vehicle.

One or more brake pads may be used to create the clamping force. The clamping force can be created by converting the kinetic energy of the vehicle into thermal energy by frictionally engaging one or more brake pads with one or more sides of the brake rotor. The one or more brake pads may include one or more features (i.e. ears, projections, etc.) that may engage or be engaged by a brake caliper, a support bracket, or both to maintain the location of the brake pads within the braking system and relative to the brake rotor.

The one or more brake pads may include a friction material and a pressure plate. The one or more brake pads may be supported on the brake caliper so that the friction material faces a side of the brake rotor. The pressure plate may oppose the friction surface. One or more brake pistons or one or more brake caliper fingers may be in selective contact with the pressure plate of a corresponding brake pad. For example, in some cases, one or more brake pistons may be in contact with the pressure plate of an inboard brake pad, and one or more brake caliper fingers may be in contact with the pressure plate of an outboard brake pad. In some cases, one or more brake pistons may be in contact with the pressure place of an inboard brake pad, and one or more brake pistons may be in contact with the pressure place of an outboard brake piston. During a brake apply, or while applying the parking brake, the one or more brake pistons and/or the one or more fingers can move all or an end of a corresponding brake pad so that the corresponding friction material engages a corresponding side of the brake rotor to create the clamping force.

The brake system may comprise a brake caliper. The brake caliper may function to support one or more the components of the brake system. For example, the brake caliper may comprise one or more supports for engaging and/or supporting one or more brake pads. The brake caliper may comprise one or more features for supporting an MGU or electric motor.

The brake caliper may move during a brake apply (i.e., a floating caliper), or the brake caliper may be fixed so that so that brake caliper does not move during a brake apply (i.e., a fixed caliper). The brake caliper may be connected or mounted to any non-rotating or moving part of a machine, structure, or vehicle, like a knuckle or a spider of a vehicle, which may be the casting that a disc brake system is mounted to.

The brake caliper may comprise one or more caliper bores. A caliper bore may be a hollow region, pocket, bore, or through-bore defined in the brake caliper that is configured or adapted to receive and support a corresponding brake piston. A brake caliper may have one caliper bore. A brake caliper may have more than one caliper bore. One or more of the caliper bores can be located on only one side of the moving component or brake rotor (i.e., either the inboard side or the outboard side), or one or more caliper bores can be located on both sides of the moving component or brake rotor (i.e., on both of the inboard side and the outboard side).

The one or more brake pistons may function to move a brake pad, or a corresponding end of brake pad, towards the brake rotor to create the clamping force. The one or more brake pistons may be moved by pressurizing fluid, such as hydraulic brake fluid. To release the clamping force or the brake apply, the one or more brake pistons can be moved by depressurizing the fluid. The one or more brake pistons can also be moved without pressuring or depressurizing hydraulic fluid. For example, the one or more brake pistons can be moved during a standard brake apply or during application of the service brake with an electric motor, for example. The one or more brake pistons be moved by actuating a corresponding rotary to linear stage mechanism in an apply direction. To release the clamping force, the one or more brake pistons can be moved by actuating the corresponding rotary to linear stage mechanism in an opposing release direction. During both a parking brake apply and a standard brake apply, the one or more brake pistons may be moved along a brake piston axis, which may be the same as, coplanar or coaxial with a spindle axis, a piston bore axis. The brake system may include one brake piston, or the brake system may include two or more brake pistons.

Each brake piston may comprise a piston pocket. The brake piston pocket may function to receive at least a portion of a corresponding rotary to linear stage mechanism. The brake piston pocket may be a cup or recess formed into one end of a brake piston. The brake piston pocket may include a bottom wall at the end or bottom of the brake piston pocket. The bottom wall may be generally perpendicular to the nut axis, the spindle axis, the axis along which the brake piston moves during a brake apply, or a combination thereof. A gap may exist between the rotary to linear stage mechanism and a corresponding bottom wall. During a brake apply, the gap may be taken up by moving the rotary to linear stage mechanism towards the bottom wall. The gap may be taken up once the nut contacts the bottom pocket wall. Once the gap is taken up, further movement of the rotary to linear stage mechanism may cause the rotary to linear stage mechanism or nut to press against the bottom wall and then move the brake piston and thus brake pad against the brake rotor to create the clamping force.

Over time, the gap between the bottom pocket wall and the nut increases. That is, over time during application of the service brake, the brake pads wear, which causes the brake piston to move further out of the caliper bore towards the brake pad, while the nut does not move with the brake piston. This gap may continue to increase, especially if the electromechanical application of parking brake is used infrequently. If and when the electromechanical application is used, the gap must first be eliminated before the clamping force can be generated, which may add addition time to creating the clamping force. These teachings provide for the nut to move along with the brake piston during application of the service brake, thus continuously changing the axial position of the nut relative to the spindle, while ensuring that the gap between the bottom pocket wall and the nut remains substantially the same. Advantageously, the time required to create the clamping force during application of the service brake should remain substantially the same, no matter if the brake system is brand new or reset, or if the electrotechnical application has not been utilized in an extended period of time.

The motor gear unit (MGU) may function to create or generate and then transfer torque suitable for creating and/or releasing a clamping force. During application of the brake, the parking brake, or both, to create a clamping force, the MGU may function to generate torque sufficient to move the one or more rotary to linear stage mechanisms, the one or more brake pistons, the one or more brake pads, or a combination thereof toward the brake rotor thus creating drag which acts to prevent vehicle wheel rotation. During release of the brake, the parking brake, or both to release the clamping force, the MGU may function to generate torque sufficient to move the one or more rotary to linear stage mechanisms, the one or more brake pistons, or both away from the one or more brake pads so that the brake pads move away from the brake rotor thus releasing the clamping force. The motor gear unit (MGU) may be any device or combination of devices that may function to perform one or more of the aforementioned functions. The MGU may be in communication with a controller, which may function to turn ON or turn OFF the MGU, the motor, or both.

The brake system, the MGU, or both may comprise a motor. The motor may be any motor for creating a force or torque. For example, the motor may be a DC motor, a brushless motor, a series-wound motor, a shunt wound motor, a compound wound motor, a separately exited motor, a servomotor, a stepping motor, or a permanent magnet motor. The motor may include one or more electrical leads for connecting the motor to a power source and/or a controller. The motor or MGU may have an output that is connected direction to the input of the spindle. Alternatively, the motor or the MGU may include one or more gears or gear trains that may function to transfer, increase, and/or decrease a torque output of the motor before the same is supplied to the spindle. The gear train may include one or more gears.

The brake system may include one or more rotary to linear stage mechanisms. The one or more rotary to linear stage mechanisms may function to transfer or convert a torque output from the motor, MGU, or gear train into a linear or axial force to move the one or more brake pistons during a parking brake apply.

The rotary to linear stage mechanism may include a spindle and a nut. The nut may be received in the piston pocket of the brake piston.

The rotary to linear stage mechanism may be a high efficiency mechanism. Efficiency may refer to how well, or how efficiently, the mechanism converts or transfers torque or a rotational load input into a linear load or output force. The efficiency may depend on one or more factors, such as lead angle and coefficient of friction of the spindle and nut, for example.

For example, the high efficiency mechanism may a ball screw assembly, a roller screw or planetary screw assembly, or a combination thereof. Exemplary ball screws may utilize ball bearings as load transfer elements between the nut and spindle or screw. During movement of the ball screw, the ball bearings may circulate along complimentary races or grooves defined in the spindle and in the nut. A roller screw or planetary screw may be similar to a ball screw except that roller screws use rollers or planets as the load transfer elements that rotate around the screw. The load on a ball screw, the roller screw, or both is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move a spindle and nut in a ball screw or roller screw in an apply direction, a release direction, or both.

One or more of the rotary to linear stage mechanisms may be a low efficiency mechanism or system. The one or more low efficiency devices may function as the mechanical brake or lock to prevent the one or more high efficiency devices from back driving. The one or more low efficiency devices may be self-locking, and may therefore sustain the clamping force of the parking brake assembly once created. Self-locking may mean the assembly will not back drive unless a sufficient opposing rotational load or torque is applied to the low efficiency spindle, nut or both, that overcomes the friction load at the threads of the low efficiency device. Accordingly, at least one low efficiency device may be used to prevent back driving of one or more of the high efficiency devices. The one or more low efficiency devices may be one or more lead screws. Lead screws may include mating helical threads between the spindle or screw and nut. In a lead screw, the friction between the spindle and nut must be first overcome before the lead screw can rotate. Accordingly, more torque may be required to rotate a lead screw than the ball screw.

The brake system may comprise one high efficiency mechanism, such as the ones illustrated and described at 106 and 206 in the figures, and one or more low efficiency mechanisms, like a lead screw, that may function as the mechanical brake to prevent back driving of the high efficiency mechanism(s).

The clutch may function to provide for the nut to move axially during a hydraulic application, while preventing the nut from rotating about the spindle axis. The clutch may function to engage, contact, be in contact with, apply a force onto the cylindrical wall of the piston pocket, in which it/they are located. The contact, engagement, or both by the clutch or clip(s) onto the pocket wall may function to exert a force or friction force onto the piston pocket wall. The clutch or clips may be spring loaded outwardly to create a friction or interference fit with the groove or the pocket wall. The clutch or one or more clips may be made of a suitable material such as plastic, metal, aluminum, rubber, etc. The clutch or one or more clips may be made of a material that is soft, flexible, pliable, compressible, or a combination thereof. The one or more clips may be made of spring steel and have memory.

The clutch may comprise one or more clips. The clips may contact the wall or groove at one or more contact points. The one or more contact points may be in the areas of the flat spots defined on the clip. The one or more contact points may be at tangent locations where the flat spots contact the circular groove or piston wall. The clips may be free of the flat spots and may contact the groove or piston wall at 360 degrees. Alternatively, the clip may include more than one or more than two flat spots for engaging the groove or the piston pocket wall.

The clip may function to provide an outwardly force and press or force an O-ring into contact with the groove and/or the piston pocket wall so that the O-ring applies a pressing force or friction force onto the wall or groove. Alternatively, the rubber O-ring material may be made integral with the clip. This may be formed by gluing or bonding rubber to the O-ring, or molding the rubber O-ring material to the outer surface of the clip via a 2-shot injection molding process or co-extrusion. The O-ring may be made of a plastic or rubber material. The O-ring may be made of a material that is soft, flexible, pliable, compressible, or a combination thereof. The O-ring may be made of spring steel and have memory.

Figure 1:
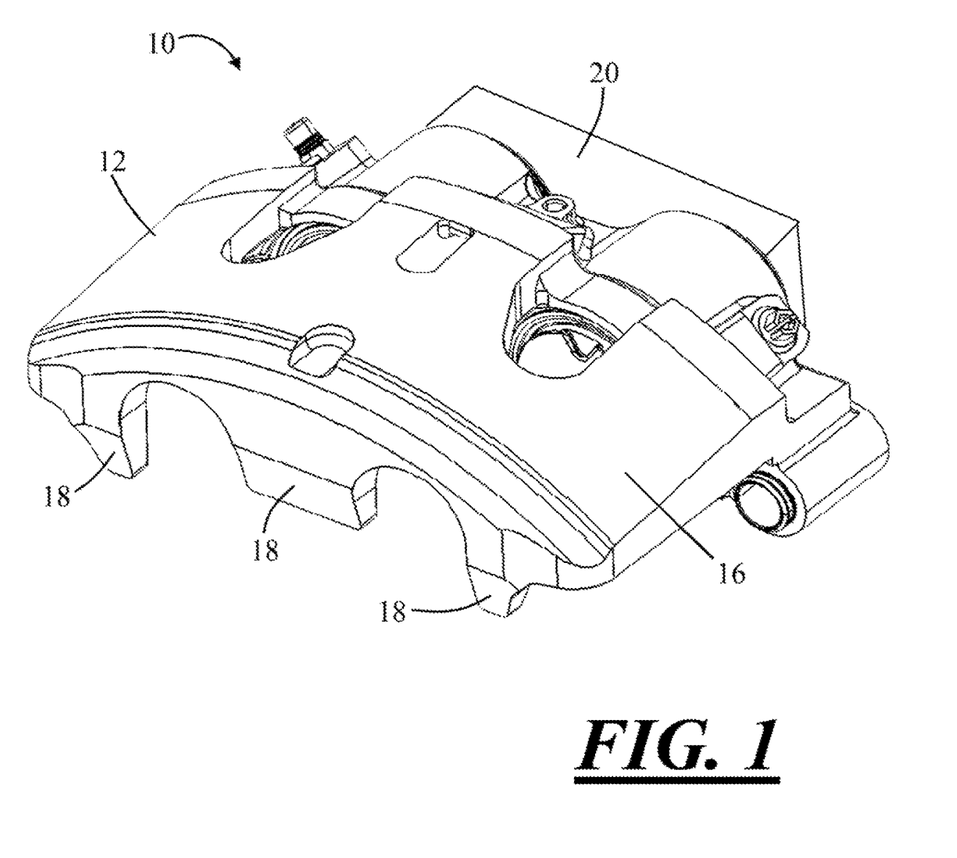
FIG. 1 is a perspective view of a brake system.

FIG. 1 illustrates a brake system 10. The brake system 10 comprises a caliper body 12. The caliper body 12 comprises a bridge 16 and fingers 18. The brake system 10 comprises a motor gear unit (MGU) 20.

Figure 2:
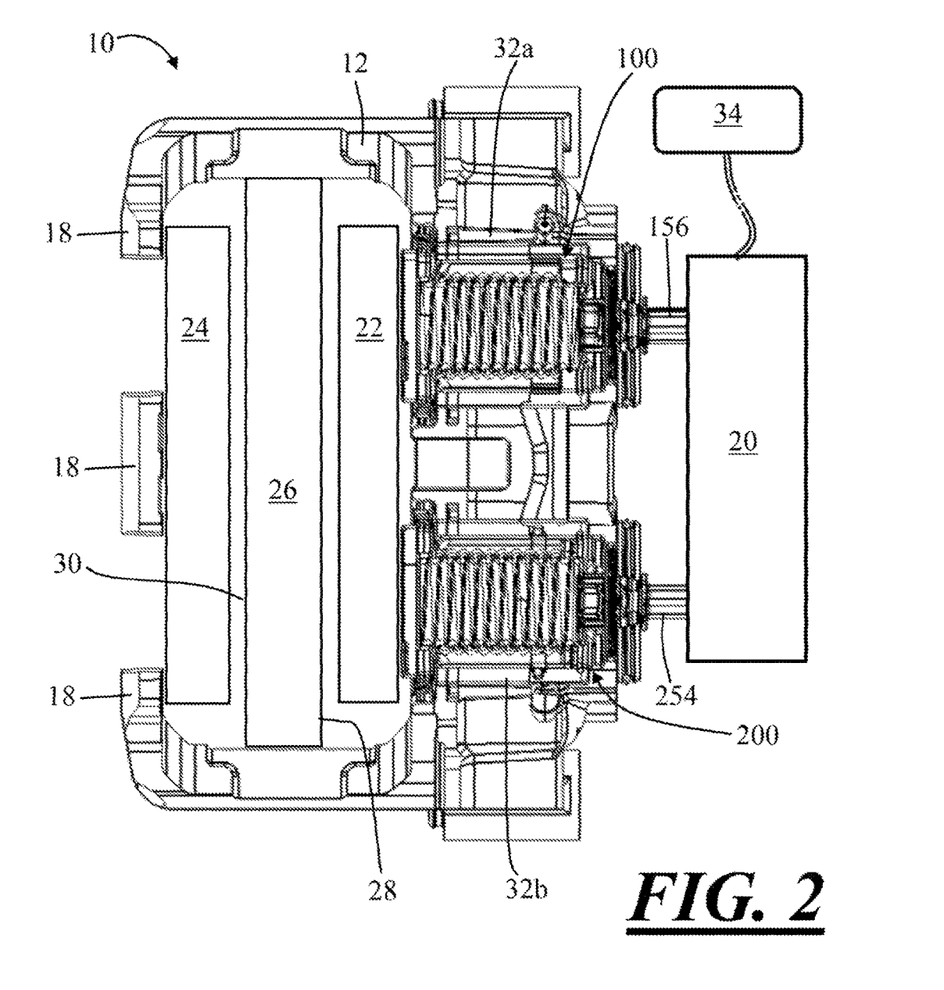
FIG. 2 is a cross-sectional view of the brake system of FIG. 1.

FIG. 2 illustrates the brake system 10. The caliper body 12 is adapted to support an inboard brake pad 22 and an outboard brake pad 24. A brake rotor 26 is located in between the brake pads 22, 24. The brake rotor 26 comprises an inboard braking surface 28 facing the inboard brake pad 22, and an outboard braking surface 30 facing the outboard brake pad 24.

The brake system 10 comprises a pair of caliper bores 32a, 32b. The brake system 10 may comprise any number of caliper bores 32a, 32b, including one caliper bore, or even three or more caliper bores. In addition, or alternatively, the brake system 10 may comprise any number of caliper bores (i.e., one or more, two or more, three or more, etc.) located at the other side of the brake rotor 26 in place of the fingers 18.

The brake system 10 comprises a brake piston assembly 100 and/or a brake piston assembly 200. The brake piston assembly 100 is illustrated as supported in the caliper bore 32a, and the brake piston assembly 200 is illustrated as supported in the caliper bore 32b. It is understood, however, that the brake piston assembly 100 can be located in both caliper bores 32a, 32b, or the brake piston assembly 200 can be located in both caliper bores 32a, 32b. It is also understood that caliper bore 32a can support brake piston assembly 200, and caliper bore 32b can comprise brake piston assembly 100. It is also understood that that the brake system 10 may comprise only a single piston assembly that is either brake piston assembly 100 or brake piston assembly 200.

The brake system 10 comprises a controller 34 that may be in communication with the MGU 20. The MGU 20 is in communication with the input portion 156, 254 of the spindle of the corresponding brake piston assembly 100, 200 described further below. The MGU 20 is adapted to create and then transfer torque to the spindles to rotate the spindles in either an apply or release direction, depending if the clamping force is to be created or released.

Figure 3:
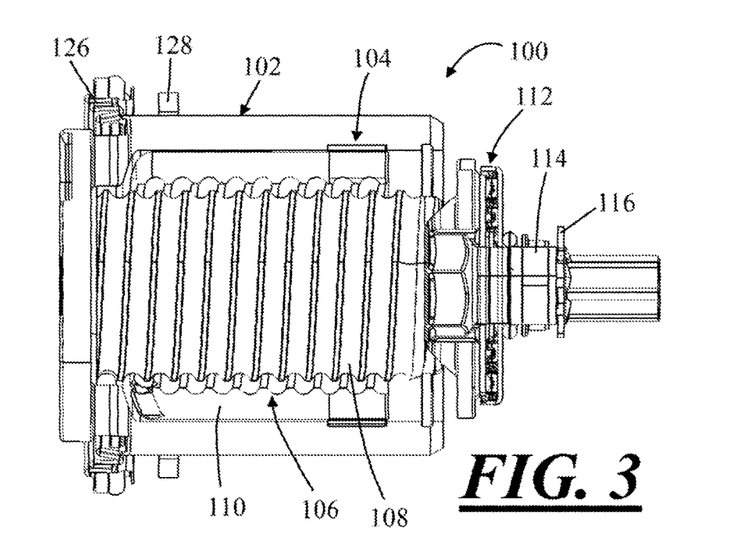
FIG. 3 is a cross-sectional view of a brake piston assembly.

FIG. 3 illustrates the brake piston assembly 100. The brake piston assembly 100 comprises a brake piston 102; a clutch 104; a rotary to linear stage mechanism 106 comprising a spindle 108 and a nut 110; a thrust bearing assembly 112; a bushing 114; and a retaining clip 116. A piston boot 126 and a piston seal 128 are disposed around an outer surface 118 of the brake piston 102.

Figure 4:
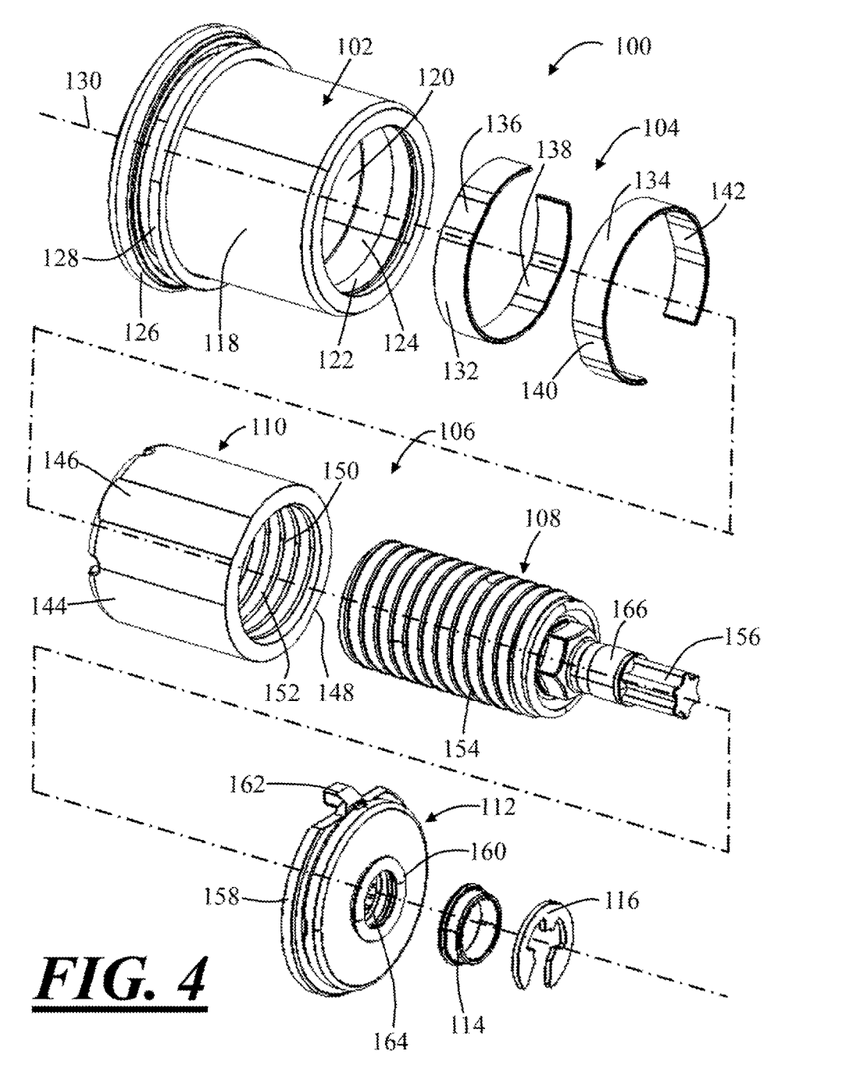
FIG. 4 is an exploded, perspective view of the brake piston assembly of FIG. 3

Referring now to FIG. 4, the brake piston 102 extends along a longitudinal axis 130. A piston pocket 120 is defined inside the brake piston 102 by an inner wall 122 and a bottom pocket wall. The piston pocket 120 is cup-shaped, and the bottom pocket wall forms the bottom of the cup. The bottom pocket wall is the wall that is located at the bottom of the piston pocket 120 and is generally perpendicular to the inner wall 122. A groove 124 is defined in the inner wall 122. The groove 124 extends into a thickness of the inner wall 122.

The clutch 104 comprises a first clip 132 and a second clip 134. When the brake piston assembly 100 is assembled, both clips 132, 134 are assembled or located in the groove 124 defined in the piston pocket 120. The clips 132, 134 are spring loaded outwardly against the groove 124 such that the clips 132, 134 exert an outward force or a friction force onto the groove 124. The friction force is applied on the groove 124 at contact points where the clips 134, 134 contact the groove 124. The first clip 132 comprises a first flat section 136 and a second flat section 138. The second clip 134 comprises a first flat section 140 and a second flat section 142.

The rotary to linear stage mechanism 106 comprises a nut 110 and a spindle 108. The nut 110 comprises an outer surface 144. The outer surface 144 comprises two flat sections 146, 148. The nut 110 comprises an inner bore or diameter 150 comprising a grooved portion 152.

The spindle 108 comprises a grooved portion 154 that is adapted to engage the grooved portion 152 of the nut 110. The rotary to linear stage mechanism 106 may be a high efficiency mechanism, and so ball bearings may be located in the grooves 152, 154. The ball bearings may move in the grooves 152, 154 when the spindle 108 is rotated and the nut 110 moves axially. Alternatively, the rotary to linear stage mechanism 106 may be a low efficiency mechanism, and grooves 152, 154 may be threaded portions adapted to threadably engage one another. A low efficiency rotary to linear stage mechanism 106 may lack the ball bearings in the grooves.

The spindle 108 comprises an input portion 156 that is adapted engage by the MGU 20. The MGU 20 is adapted to generate torque, and transfer the torque to the spindle 108 via the input portion 156 so that the spindle 108 rotates about the longitudinal axis 130.

The thrust bearing assembly 112 comprises a cage 158 that is adapted to support a thrust bearing 160. The thrust bearing 160 is adapted to rotate inside the cage 158. The cage 158 comprises a hanger 162 that is adapted to engage the caliper body 12 to mount the assembly 112 and prevent the thrust bearing assembly 112 from otherwise moving. The thrust bearing 160 comprises an input portion 164. When assembled, the input portion 156 of the spindle 108 is received through the input portion 164 of the thrust bearing 160.

The bushing 114 and retaining clip 116 are adapted to surround a collar 166 of the spindle 108. The retaining clip 116 is adapted to engage the input portion 156 of the spindle 108 and restrict axial movement of the spindle 108 along the longitudinal axis 130.

Figure 5:
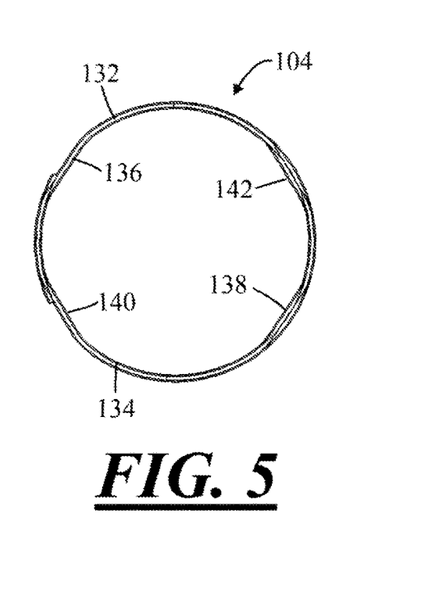
FIG. 5 is a cross-sectional view of the clutch of the brake piston assembly of FIGS. 3 and 4.

FIG. 5 illustrates the clutch 104. The first flat section 136 and the second flat section 138 of the first clip 132 generally oppose each other, and the first flat section 140 and the second flat section 142 of the second clip 134 generally oppose each other.

Figure 6:
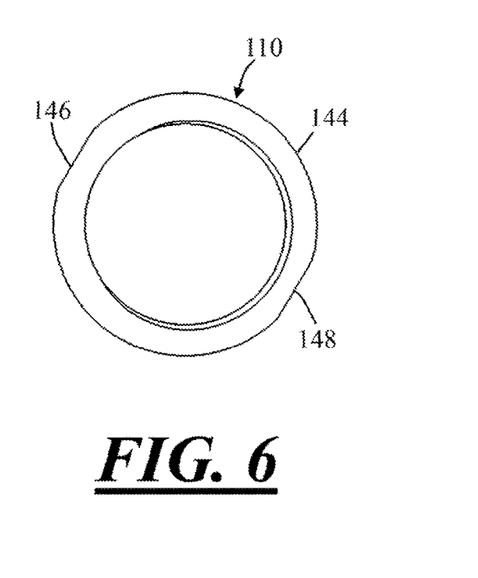
FIG. 6 is a cross-sectional view of the nut of the brake piston assembly of FIGS. 3 and 4.

FIG. 6 illustrates the nut 100. The first flat section 146 and the second flat section 148 defined on the outer surface 144 generally oppose each other.

Referring back to FIG. 5, in an assembled configuration, either the first flat section 136 and the second flat section 138 of the first clip 132 are adapted to contact the first flat section 146 and the second flat section 148 of the nut 110, or the first flat section 140 and the second flat section 142 of the second clip 134 are adapted to contact the first flat section 146 and the second flat section 148 of the nut 110.

Referring now to FIGS. 1-6, operation of the brake system 10 utilizing the brake piston assembly 100 will be described. The brake system 10 is operable in two braking applications, namely a first braking application and a second braking application.

The first braking application may utilize pressurized fluid, such as hydraulic fluid, to move the brake piston 102. The second braking application may utilize an electromechanical system, namely the MGU 20 and the rotary to linear stage mechanism 106, to move the brake piston 102.

The first braking application may be application of a service brake, and the second braking application may be an application of the parking brake, or vice versa.

During the first braking application, the fluid may be pressurized, which may function to exert a fluid pressure force or a pressing force on the brake piston 102. The fluid pressure force or the pressing force may function to move the brake piston 102 in an apply direction along the longitudinal axis 130 towards the inboard brake pad 22. The pressurized fluid pressure or pressing force applied on the brake piston 102 in turn exerts a force onto the clips 132, 134, which are in contact with the nut 110. The exerted force on the clips 132, 134 and nut 110 generates torque on the clips 132, 134 and nut 110.

When the torque exerted onto the clips 132, 134 and nut 110 by the brake piston 102 is less than the friction force exerted by the clips 132, 134 outwardly onto the groove 124 of the inner wall 122 the brake piston 102, the nut 110 and the clutch 104 are restricted or prevented from rotating or otherwise moving along or about the longitudinal axis 130. Stated another way, when the friction force exerted by the clips 132, 134 outwardly onto the groove 124 of the inner wall 122 the brake piston 102 is greater than the torque exerted on the clips 132, 134 and nut 110 by the brake piston 102, the nut 110 and the clutch 104 are restricted or prevented from rotating or otherwise moving along or about the longitudinal axis 130. Instead, the pressurized fluid pressure or pressing force will only function to move the brake piston 102 along the longitudinal axis 130 and into contact with the inboard brake pad 22. The piston seal 128 is adapted to prevent the brake piston 102 from rotating about the axis 130 during this movement.

Because the clips 132, 134 are received in the groove 124 of the brake piston 102, the clips 132, 134 are adapted to move axially with the brake piston 102 when the brake piston 102 is moved axially. The flats 136, 138 and 140, 142 of the clips 132, 134 engaging the corresponding flats 146, 148 of the nut 110 provide for the clips 132, 134 to slide along the nut 110 during this condition or movement.

Continued axial movement of the brake piston 102 in the apply direction will eventually cause the inboard brake pad 22 to move into contact with the inboard braking surface 28 of the brake rotor 26 to create the clamping force. During this movement, an opposing reaction force is generated, which provides for the fingers 18 to pull the outboard brake pad 24 into contact with the outboard braking surface 30 of the brake rotor 26 to generate the clamping force.

After the torque exerted on the clips 132, 134 and nut 110 by the brake piston 102 by the pressurized fluid exceeds or is greater than the friction force exerted by the clips 132, 134 onto the groove 124 of the inner wall 122 of the brake piston 102, the nut 110 and the clutch 104 may begin to rotate about the longitudinal axis 130. Stated another way, after the friction force exerted by the clips 132, 134 onto the groove 124 of the inner wall 122 of the brake piston 102, is less than the torque exerted on the clips 132, 134 and nut 110 by the brake piston 102 (by the pressurized hydraulic fluid), the nut 110 and the clutch 104 may begin to rotate about the longitudinal axis 130. This condition may occur when or after or while the inboard brake pad 22 contacts the brake rotor 26 and generates the clamping force, which results in an opposing force or resistance applied on the brake piston 102 in a generally opposite direction that the hydraulic fluid is applied on the brake piston 102. Because the nut 110 is threadably engaged with the spindle 108, which is locked or restricted from rotating about the axis 130, rotation of the nut 110 will also cause the nut 110 to move or translate axially with the brake piston 102 in the direction of the inboard brake pad 22.

By providing for the nut 110 to move with the brake piston 102 during the hydraulic application, the general positional relationship between the brake piston 102 and the nut 110 remains substantially the same during the first braking application. Advantageously, this ensures or provides for the gap defined between the nut 110 and the bottom pocket wall of the brake piston 102 to remain substantially the same, even though the brake piston 102 may move or reposition further out of the corresponding caliper bore over time as the brake pads wear. This ensures that lag time or response time between the nut contacting the bottom pocket wall does not increase over time as the brake piston 102 moves further out of the caliper bore, which would undesirably result in increased time to apply the brake during the electromechanical or second braking application discussed below.

During the second braking application, a signal may be sent to the MGU 20, for example, via the controller 34, which may cause the MGU 20 to generate torque. The torque from the MGU 20 may be applied or transferred to the input portion 156 of the spindle 108, which may cause the spindle 108 to rotate about the longitudinal axis 130 in an apply direction. Rotation of the spindle 108 in the apply direction functions to exert a pushing force onto the nut 110. When the friction force exerted by the clips 132, 134 on the groove 124 of the brake piston 102 is greater than the pushing force exerted onto the nut 110 by the spindle 108, the nut 110 and the clutch 104 are both restricted or prevented from rotating about the longitudinal axis 130. Stated another way, when the pushing force exerted onto the nut 110 by the spindle 108 is less than the friction force exerted by the clips 132, 134 on the groove 124 of the brake piston 102, the nut 110 and the clutch 104 are both restricted or prevented from rotating about the longitudinal axis 130. Instead, the nut 110 will slide or translate along the flats 136, 138 or 140, 142 of the clips 132, 134 along the longitudinal axis 130.

Because the clips 132, 134 are trapped in the groove 124 of the brake piston 102, the clips 134, 134 do not move axially with the nut 110. Moreover, because the friction force exerted by the clips 132, 134 on the brake piston 102 is greater than the pushing force exerted onto the nut 110, the clips 132, 134 will not rotate about the longitudinal axis 130.

The spindle 108 may be rotated by the MGU 20 until the nut 110 is moved into contact with the bottom pocket wall of the piston pocket 120. Continued rotation of the spindle 108 in the apply direction by the MGU 20 causes the nut 110 to push the brake piston 102 into contact with the inboard brake pad 22, which results in the inboard brake pad 22 being moved towards the inboard side 28 of the brake rotor 26 until contact is made therebetween thus generating clamping force. An opposing reaction force causes the fingers 18 to pull the outboard brake pad 24 into contact with the outboard side of the brake rotor 30 generating clamping force.

Figure 7:
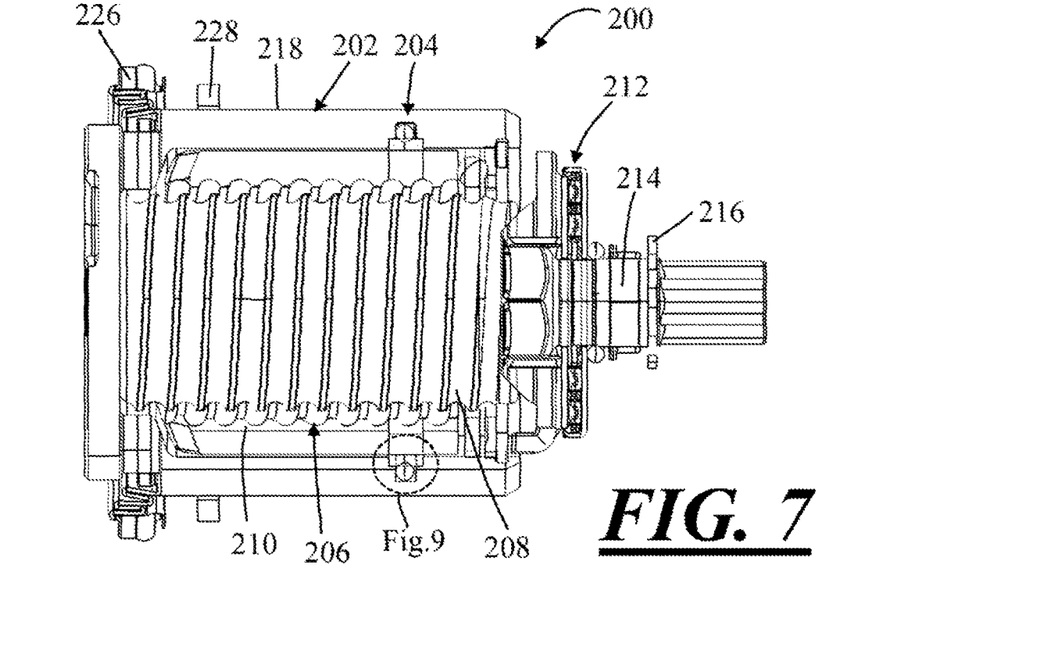
FIG. 7 is a cross-sectional view of a brake piston assembly.

FIG. 7 illustrates the brake piston assembly 200. The brake piston assembly 200 comprises a brake piston 202; a clutch 204; a rotary to linear stage mechanism 206 comprising a spindle 208 and a nut 210; a thrust bearing assembly 212; a bushing 214; and a retaining clip 216. A piston boot 226 and a piston seal 228 are disposed around an outer surface 218 of the brake piston 202.

Figure 8:
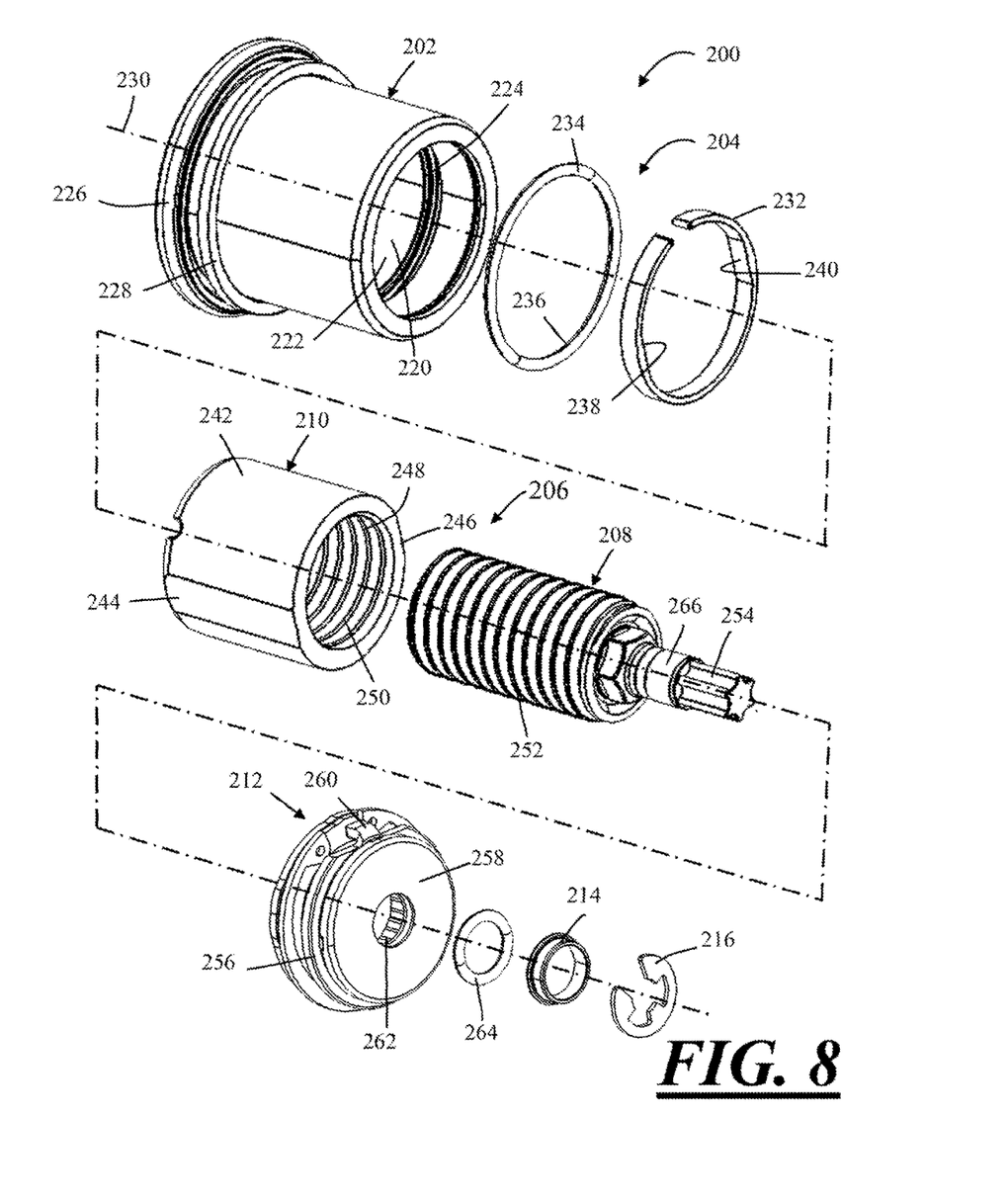
FIG. 8 is an exploded, perspective view of the brake piston assembly of FIG. 7.

Referring now to FIG. 8, the brake piston 202 extends along a longitudinal axis 230. A piston pocket 220 is defined inside the brake piston 202 by an inner wall 222. The piston pocket 220 is cup-shaped, and comprises a bottom pocket wall that forms the bottom of the cup. The inner wall 222 comprises a groove 224 that extends into a thickness of the inner wall 222.

The clutch 204 comprises a clip 232 and an O-ring 234. The O-ring 234 is received into, assembled, or located in the groove 224 of the piston pocket 220. In an assembled confirmation, the clip 232 is located inside the inner diameter 236 of the O-ring 234. The clip 232 is spring located outwardly, and is adapted to press and maintain the O-ring 234 in the groove 224 and the piston pocket 120 such that the O-ring 234 exerts a friction force on the walls or surfaces defining the groove 124 and/or the piston pocket 120. The clip 232 comprises a first flat section 238 and a second flat section 240.

The nut 210 comprises an outer surface 242. The outer surface 242 comprises two flat sections 244, 246 defined thereon. When the brake piston assembly 200 is assembled, the flats 238, 240 are adapted to engage or contact or be aligned with the flats 244, 246 of the nut 210. The nut 210 comprises an inner bore or diameter 248 comprising a grooved portion 250.

The spindle 208 comprises a grooved portion 252 that is adapted to engage the grooved portion 250 of the nut 210. The rotary to linear stage mechanism 206 may be a high efficiency mechanism, and so ball bearings may be located in the grooves 250, 252. The ball bearings may move in the grooves 250, 252 when the spindle 208 is rotated and the nut 210 moves axially. Alternatively, the rotary to linear stage mechanism 206 may be a low efficiency mechanism, and grooves 250, 252 may be threaded portions adapted to threadably engage one another. A low efficiency rotary to linear stage mechanism 206 may lack the ball bearings in the grooves.

The spindle 208 comprises an input portion 254 that is adapted to be engaged by the MGU 20, which is adapted to rotate the spindle 208 about the longitudinal axis 230.

The thrust bearing assembly 212 comprises a cage 256 supporting a thrust bearing 258. The cage 256 comprises a hanger 260 that is adapted to engage the caliper body 12 and prevent the thrust bearing assembly 212 from moving. The thrust bearing 258 comprises an input portion 262. When assembled, the input portion 254 of the spindle 208 is received through the input portion 262 of the thrust bearing 258.

The spindle O-ring 264 and the bushing 214 are adapted to surround a collar 266 of the spindle 208. The retaining clip 216 is adapted to engage the input portion 254 of the spindle 208 and restrict axial movement of the spindle 208 along the longitudinal axis 230.

Figure 9:
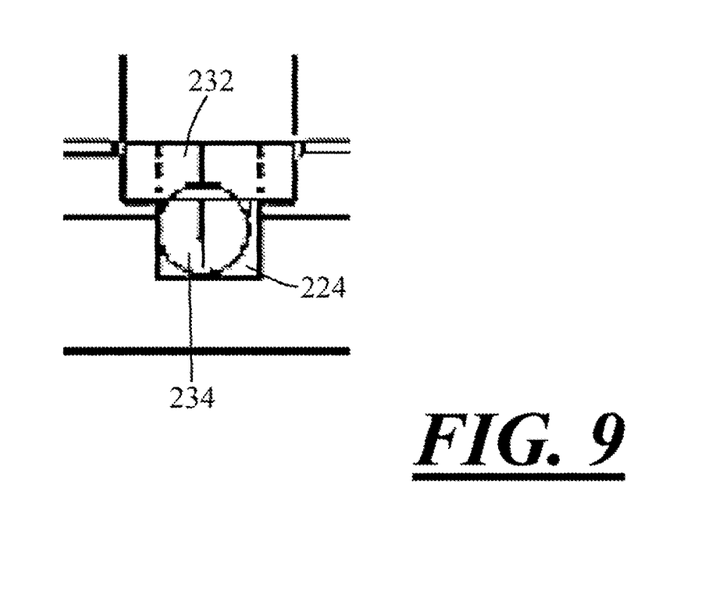
FIG. 9 is a close up view of a portion of the brake piston assembly of FIG. 7.

FIG. 9 illustrates the O-ring 234 received into the groove 224. The O-ring 234 is sandwiched between the groove 224 and the clip 232. The clip 232 is sprung outwardly such that the O-ring 234 applies a friction force on the walls or surfaces defining the groove 224.

Referring to FIGS. 1, 2, and 7-9, operation of the brake system 10 utilizing the brake piston assembly 200 will be described. The brake system 10 is operable in two braking applications or conditions, namely a first braking application and a second braking application. The first braking application may be application of a service brake, and the second braking application may be an application of the parking brake, or vice versa.

The first braking application may utilize pressurized fluid, such as hydraulic fluid, to move the brake piston 202 to create clamping force. The second braking application may utilize an electromechanical system, namely the MGU 20 and the rotary to linear stage mechanism 206, to move the brake piston 202 to create clamping force.

During the first braking application, the fluid may be pressurized, which may exert a fluid pressure or a pressing force on the brake piston 202. The fluid pressure or pressing force may function to move the brake piston 202 along the longitudinal axis 230 in an apply direction towards the inboard brake pad 22. Movement of the brake piston 202 by the fluid pressure or pressing force exerts a force onto the clip 232 and O-ring 234, which are in contact with the nut 210. The exerted force on the clip 232, O-ring 234, and nut 210 generates torque.

When the torque exerted onto the clip 232, O-ring 234, and nut 210 by the brake piston 202 is less than the friction force exerted by the clip 232 and O-ring 234 outwardly onto the groove 224 of the inner wall 222 the brake piston 202, the nut 210 and the clutch 204 are both restricted or prevented from rotating or otherwise moving along or about the longitudinal axis 230. Stated another way, when the friction force exerted by the clip 232 and O-ring 234 outwardly onto the groove 224 of the inner wall 222 the brake piston 202 is greater than the torque exerted on the clip 232, O-ring 234, and nut 210 by the brake piston 202, the nut 210 and the clutch 204 are both restricted or prevented from rotating or otherwise moving along or about the longitudinal axis 230. Instead, only the brake piston 202 will move along the longitudinal axis 230 and into contact with the inboard brake pad 22. The piston seal 228 is adapted to prevent the brake piston 202 from rotating about the axis 230 during this time.

Because the clip 232 and O-ring 234 are received in the groove 224 of the brake piston 202, the clip 232 and O-ring 234 move axially with the brake piston 202. That is, the flats 238, 240 of the clip 232 "slide" along the corresponding flats 244, 246 of the nut 210.

Further axial movement of the brake piston 210 will eventually cause the inboard brake pad 22 to move into contact with the inboard braking surface 28 of the brake rotor 26 to create the clamping force. An opposing reaction force is generated, which functions to pull the outboard brake pad 24 into contact with the outboard braking surface 30 of the brake rotor 26 to generate the clamping force.

After the torque exerted on the clip 232, O-ring 234, and nut 210 by the brake piston 202 exceeds or is greater than the friction force exerted by the clip 232 and O-ring 234 onto the groove 224 of the inner wall 222 of the brake piston 242, the nut 210 and the clutch 204 may begin to rotate about the longitudinal axis 230. Stated another way, when the friction force exerted by the clip 232 and O-ring 234 onto the groove 224 of the inner wall 222 of the brake piston 242 is less than the torque exerted on the clip 232, O-ring 234, and nut 210 by the brake piston 202, the nut 210 and the clutch 204 may begin to rotate about the longitudinal axis 230. Because the nut 210 is threadably engaged with the spindle 208, which is locked or restricted from rotating about the axis 230, rotation of the nut 210 will also cause the nut 210 to move or translate axially with the brake piston 202 in the direction of the inboard brake pad 22. The torque exerted on the clip 232, O-ring 234, and nut 210 by the brake piston 202 may exceed or be greater than the friction force exerted by clip 232 and O-ring 234 onto the groove 224 of the inner wall 222 of the brake piston 202 when the inboard brake pad 22 contacts the brake rotor 26 and generates the clamping force, which results in an opposing force or resistance applied on the brake piston 202 in a generally opposite direction that the hydraulic fluid is applied on the brake piston 202.

By providing for the nut 210 to move with the brake piston 202, the general positional relationship between the brake piston 202 and the nut 210 remains substantially the same during the first braking application. Advantageously, this ensures or provides for the gap defined between the nut 210 and the bottom pocket wall of the brake piston 202 to remain substantially the same, even though the brake piston 202 is moved further out of the corresponding caliper bore over time as the brake pads wear. This ensures that lag time between the nut contacting the bottom pocket wall does not increase over time as the brake piston 202 moves further out of the caliper bore, which would undesirably result in increased time to apply the parking brake.

After contact is made between the brake piston 202 and the inboard brake pad 22, continued movement of the brake piston 202, and thus also the nut 210, causes the inboard brake pad 22 to be moved towards the inboard side 28 of the brake rotor 26 until contact is made therebetween thus generating clamping force. An opposing reaction force causes the fingers 18 to pull the outboard brake pad 24 into contact with the outboard side of the brake rotor 30 generating clamping force.

During the second braking application, a signal may be sent to the MGU 20, for example, via the controller 34, which may cause the MGU 20 to generate torque. The torque from the MGU 20 may be applied or transferred to the input portion 254 of the spindle 208, which may cause the spindle 208 to rotate about the axis 230 in an apply direction. Rotation of the spindle 208 in the apply direction exerts a pushing force onto the nut 210.

When the friction force exerted by the clip 232 and O-ring 234 on the brake piston 202 is greater than the pushing force exerted onto the nut 210 by the spindle 208, the nut 210 and the clutch 204 are both restricted or prevented from rotating about the longitudinal axis 230. Stated another way, when the pushing force exerted onto the nut 210 by the spindle 208 is less than the friction force exerted by the clip 232 and O-ring 234 on the brake piston 202, the nut 210 and the clutch 204 are both restricted or prevented from rotating about the longitudinal axis 230. Instead, the nut 210 will "slide" along the flats 238, 240 of the clip 232 and move or translate axially along the longitudinal axis 230.

Because the clip 232 and O-ring 234 are trapped in the groove 224, the clip 232 and O-ring 234 do not move axially with the nut 210. Moreover, because the friction force exerted by the clip 232 and O-ring 234 on the brake piston 202 is greater than the pushing force exerted onto the nut 210, the clip 232 and O-ring 234 will not rotate about the longitudinal axis 230.

The spindle 208 may be rotated by the MGU 20 until the nut 210 is moved into contact with the bottom pocket wall of the piston pocket 220. Continued rotation of the spindle 208 in the apply direction by the MGU 20 causes the nut 210 to push the brake piston 202 into contact with the inboard brake pad 22, which results in the inboard brake pad 22 being moved towards the inboard side 28 of the brake rotor 26 until contact is made therebetween thus generating clamping force. An opposing reaction force causes the fingers 18 to pull the outboard brake pad 24 into contact with the outboard side of the brake rotor 30 generating clamping force.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

By use of the term "may" herein, it is intended that any described attributes that "may" be included are optional.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A brake system comprising:
a brake piston extending along a longitudinal axis, the brake piston comprising a piston pocket;
a rotary to linear stage mechanism comprising a spindle and a nut, the nut is received in the piston pocket; and
a clutch comprising a first clip that is adapted to at least partially surround an outer surface of the nut, the first clip is received in a groove defined in the piston pocket;
wherein the brake system is operable in a first braking application and in a second braking application:
wherein:
  i) during the first braking application, the clutch is adapted to provide for the nut to rotate; and
  ii) during the second braking application, the clutch is adapted to restrict or prevent the nut from rotating.

2. The brake system according to claim 1, wherein the rotary to linear stage mechanism is a high efficiency mechanism that comprises ball bearings disposed between the spindle and the out.

3. The brake system according to claim 1, wherein the first clip is spring loaded and adapted to apply an outwardly fiction force onto the groove,
wherein during the first braking application, the nut rotates about the longitudinal axis when a torque applied on the brake piston is greater than a friction force applied by the first clip on the groove, and
wherein during the second braking application, the nut is restricted or prevented from rotating about the longitudinal axis when a torque applied on the nut is less than the fiction force applied by the first clip on the groove.

4. The brake system according to claim 3, wherein during the first braking application, the torque applied on the brake piston is generated by pressurized fluid.

5. The brake system according to claim 3, wherein during the second braking application, the torque applied on the brake piston is generated with an electric motor.

6. The brake system according to claim 1, wherein the clutch comprises a second clip that is adapted to at least partially surround the outer surface of the nut, the second clip is received in the groove, the second clip is spring loaded and adapted to apply an outwardly fiction force onto the groove,
wherein during the first braking application, the nut is restricted or prevented from rotating about the longitudinal axis when the friction force applied by the first clip and the second clip on the groove is greater than torque applied on the brake piston, and
wherein during the second braking application, the nut rotates about the longitudinal axis when a torque applied on the nut is greater than the friction force applied by the first clip and the second clip on the groove.

7. The brake system according to claim 1, wherein during the first braking application, the first clip is adapted to rotate with the nut when the nut rotates.

8. The brake system according to claim 1, wherein the clutch comprises a second clip that is adapted to at least partially surround the outer surface of the nut, both the first clip and the second clip are received in the groove.

9. The brake system according to claim 1, wherein the first clip comprises a first flat section, and the outer surface of the nut comprises a first flat section, the first flat section of the clip is adapted to engage the first flat section of the nut.

10. The brake system according to claim 9, wherein the first clip comprises a second flat section, and the nut comprises a second flat section, the second flat section of the clip is adapted to engage the second flat section of the nut.

11. The brake system according to claim 10, wherein the clutch comprises a second clip that is adapted to at least partially surround the outer surface of the nut, both the first clip and the second clip are received in the groove defined in the piston pocket,
wherein the second clip is spring loaded and adapted to apply a fiction force onto the groove,
wherein the second clip comprises a first flat section and a second flat section, and
wherein either the first flat section and the second flat section of the first clip are adapted to engage the corresponding first flat section and the second flat section of the nut, or the first flat section and the second flat section of the second clip are adapted to engage the corresponding first flat section and the second flat section of the nut.

12. A brake system comprising:
a brake piston extending along a longitudinal axis, the brake piston comprising a piston pocket;
a rotary to linear stage mechanism comprising a spindle and a nut, the nut is received in the piston pocket; and
a clutch;
wherein the brake system is operable in a first braking application and in a second braking application;
wherein:
  i) during the first braking application, the clutch is adapted to provide for the nut to rotate about the longitudinal axis; and
  ii) during the second braking application, the clutch is adapted to restrict or prevent the nut from rotating about the longitudinal axis,
wherein the clutch comprises an O-ring and a clip, the clip is adapted to at least partially surround an outer surface of the nut, and the O-ring is received in a groove defined in the piston pocket.

13. The brake system according to claim 12, wherein the O-ring comprises an inner diameter, and the clip that is located inside the inner diameter.

14. The brake system according to claim 13, wherein the clip is spring loaded and is adapted to press the O-ring into the groove so that the O-ring applies a friction force onto the groove.

15. The brake system according to claim 14, wherein during the first braking application, the nut rotates about the longitudinal axis when a torque applied on the brake piston is greater than the friction force applied by the O-ring on the groove, and wherein during the second braking application the clutch is adapted to restrict or prevent the nut from rotating about the longitudinal axis when the torque applied on the brake piston is less than the friction force applied by the O-ring on the groove.

16. The brake system according to claim 12, wherein during the first braking application, the nut is restricted or prevented from rotating about the longitudinal axis when friction force applied by the O-ring on the groove is greater than a torque applied on the brake piston, and wherein during the second braking application, the nut rotates about the longitudinal axis when a torque applied on the nut is greater than the friction force applied by the O-ring on the groove.

17. The brake system according to claim 16, wherein during the first braking application, the torque applied on the brake piston is generated by pressurized fluid.

18. The brake system according to claim 16, wherein during the second braking application, the torque applied on the brake piston is generated with an electric motor.

19. The brake system according to claim 16, wherein during the first braking application, the torque applied on the brake piston is generated by pressurized fluid, and during the second braking application, the torque applied on the brake piston is generated with an electric motor.

20. The brake system according to claim 16, wherein during the first braking application the clutch is adapted to rotate with the nut when the nut rotates.

* * * * *